United States Patent [19]

Andrews et al.

[11] Patent Number: 5,270,120
[45] Date of Patent: Dec. 14, 1993

[54] DATA CARRYING LAMINATE

[75] Inventors: Christopher M. Andrews, Cambridge; Edward Irving, Burwell, both of England

[73] Assignee: Ciba-Geigy Corporation, Ardsley, N.Y.

[21] Appl. No.: 914,488

[22] Filed: Jul. 14, 1992

Related U.S. Application Data

[63] Continuation of Ser. No. 772,643, Oct. 8, 1991, abandoned, which is a continuation of Ser. No. 451,480, Dec. 15, 1989, abandoned.

[30] Foreign Application Priority Data

Dec. 20, 1988 [GB] United Kingdom ............... 8829642

[51] Int. Cl.$^5$ .................... B32B 23/08; B32B 27/10
[52] U.S. Cl. ....................................... 428/507; 430/2; 522/120; 525/303; 525/304; 525/305
[58] Field of Search .................. 428/507; 430/2; 522/120; 525/303, 304, 305

[56] References Cited

U.S. PATENT DOCUMENTS

| | | | |
|---|---|---|---|
| 3,793,282 | 2/1974 | Fock et al. | 525/303 |
| 3,840,390 | 10/1974 | Kozu et al. | 525/303 |
| 3,857,768 | 12/1974 | Kagiya et al. | 522/126 |
| 4,442,267 | 4/1984 | Charnock | 525/309 |
| 4,613,652 | 9/1986 | Nakayama et al. | 525/305 |

FOREIGN PATENT DOCUMENTS 0273012 6/1988 European Pat. Off. .

*Primary Examiner*—Paul J. Thibodeau
*Assistant Examiner*—D. S. Nakarani
*Attorney, Agent, or Firm*—William A. Teoli, Jr.

[57] ABSTRACT

A data-carrying laminate such as a credit card or identity card comprises a sheet of cellulosic material or synthetic material and a thermoplastic polymeric film, at least one of said sheet and said thermoplastic film carrying data, said sheet and said thermoplastic film being bonded together by a cured adhesive layer obtained by curing a solid film adhesive comprising (A) a solid polymer of a vinyl carboxylic acid and (B) a curable material having at least one acrylate or methacrylate group.

14 Claims, No Drawings

DATA CARRYING LAMINATE

This application is a continuation of application Ser. No. 772,643 filed Oct. 8, 1991 now abandoned, which is a continuation of Ser. No. 451,480, filed Dec. 15, 1989, now abandoned.

This invention relates to data-carrying laminates, for example security cards, such as credit cards or access control cards, or laminated passport photographs, to a method of making such laminates and to film adhesives useful in such laminates.

BACKGROUND OF THE INVENTION

Security cards such as identity cards and credit cards conventionally comprise a data-carrying sheet of, for example, paper or card, protected by a layer of a transparent plastics material. The latter is usually applied to the data-carrying sheet by a laminating process. The plastics material is usually a thermoplastic material and adhesion between the data-carrying sheet and the plastics material is obtained either by the use of a hot-melt adhesive or by relying on melting of the surface of the plastics material during the laminating process. These conventional methods of effecting adhesion between the data-carrying sheet and the plastics material have not proved satisfactory because, after heating, these layers of the card can be delaminated without destroying the data-carrying sheet. Similarly, in conventional methods of producing a security device incorporating a hologram, a hologram comprising a film of polymeric material having thereon a layer of gelatin bearing a holographic image is bonded to another component of the device using a hot melt adhesive. Again these conventional methods have not proved satisfactory since holograms bonded to security cards by hot melt adhesives can be removed after moderate heating without destroying the hologram or the security card.

In European Patent Publication EP-A-0273012, it has been proposed to bond a gelatinous surface such as that of a hologram to another surface using an adhesive comprising a carboxylic acid having at least one polymerisable acrylic group. It is indicated that the adhesive can be liquid or solid (including a solid preformed film). While liquid adhesives in accordance with EP-A-0273012 have been used successfully, the formulation and use of film adhesives has proved more problematic, so that with film adhesives it is frequently difficult to achieve the desired bond strengths.

It has now been found that good bond strengths between component layers of data-carrying laminates at temperatures up to 135° C. can be achieved by the use of curable solid self-supporting film adhesives comprising a solid polymer of a vinyl carboxylic acid and a curable material having at least one acrylate or methacrylate group. It has also been found that it is not necessary to include in the film adhesive a carboxylic acid having a polymerisable acrylic group which is the essential component of the adhesive described in EP-A-0273012, thereby avoiding the problems which can arise in some instances because of the corrosive nature of such carboxylic acids. When component layers of a data-carrying laminate are bonded using a curable solid self-supporting film adhesive comprising a solid polymer of a vinyl carboxylic acid and a curable material having at least one acrylate or methacrylate group, the film adhesives can be cured by photopolymerisation of thermal polymerisation to give a bond strength such that the component layers of the laminate cannot be separated without destroying the layers themselves.

SUMMARY OF THE INVENTION

Accordingly, the present invention provides a data-carrying laminate which comprises a sheet of cellulosic material and/or synthetic polymeric material and a thermoplastic polymeric film, at least one of said sheet and said thermoplastic film carrying data, said sheet and said thermoplastic film being bonded together by a cured adhesive layer obtained by curing a solid film adhesive comprising (A) a solid polymer of a vinyl carboxylic acid and (B) a curable material having at least one acrylate or methacrylate group.

The invention also provides a method of making a data-carrying laminate as hereinbefore described which comprises (1) sandwiching a curable solid film adhesive comprising (A) and (B) as hereinbefore defined between, and in contact with, said sheet and said thermoplastic polymeric film and (ii) subjecting the adhesive to curing conditions therefor until it is cured.

DESCRIPTION OF THE INVENTION

The polymer component (A) of the film adhesive may be, for example, a polymer of acrylic acid, methacrylic acid, itaconic acid or a carboxyl group-containing adduct of a hydroxyalkyl acrylate or hydroxyalkyl methacrylate with a polycarboxylic acid anhydride. Examples of carboxyl-containing adducts from which the polymer may be derived include adducts of 2-hydroxyethyl acrylate, 2-hydroxypropyl acrylate, 3-hydroxypropyl acrylate, 4-hydroxybutyl acrylate or the corresponding methacrylates with adipic anhydride, glutaric anhydride, maleic anhydride, hexahydrophthalic anhydride, tetrahydrophthalic anhydride, phthalic anhydride or trimellitic anhydride.

The polymers of such vinyl carboxylic acids may be homopolymers or copolymers with at least one other vinyl monomer, which may be, for example, another vinyl carboxylic acid, a vinyl ester such as vinyl acetate, a vinyl halide such as vinyl chloride, a styrene such as styrene itself, p-chlorostyrene or α-methylstyrene or, preferably, an alkyl acrylate or alkyl methacrylate such as methyl acrylate, ethyl acrylate, n-butyl acrylate, n-hexyl acrylate, 2-ethylhexyl acrylate and the corresponding methacrylates such as 2-hydroxyethyl acrylate, 2-hydroxypropyl acrylate, 3-hydroxypropyl acrylate or a hydroxyalkyl acrylate or hydroxyalkylmethacrylate, 4-hydroxybutyl acrylate and the corresponding methacrylates.

These homopolymers and copolymers may have weight average molecular weights from 2,000 to 1,000,000, preferably from 50,000 to 500,000.

Among the above polymers, those preferred for use as (A) include polymers of acrylic acid or methacrylic acid, particularly homopolymers of acrylic acid, copolymers of acrylic acid or methacrylic acid with at least one other vinyl monomer, particularly an alkyl acrylate, alkyl methacrylate or itaconic acid, and mixtures of two or more thereof. The preferred polymers preferably have a weight average molecular weight of 50,000 to 500,000.

Many solid polymers specified as suitable for use as (A) are available commercially. Those which are not may be prepared by conventional polymerisation processes using free radical polymerisation initiators such as peroxides or azo compounds.

The curable material (B) may be a monoacrylic material containing one acryloyloxy or methacryloyloxy group together with a hydroxyl or carboxyl group, a material containing, on average, more than one acryloyloxy or methacryloyloxy group per molecule or a mixture of two or more thereof.

Preferred monoacrylic materials for use as (B) include hydroxyalkyl acrylates and hydroxyalkyl methacrylates such as 2-hydroxyethyl acrylate, 2-hydroxypropyl acrylate, 3-hydroxypropyl acrylate, 4-hydroxybutyl acrylate, the corresponding methacrylates and mixtures of two or more thereof; carboxyalkyl acrylates and carboxyalkyl methacrylates such as 2-carboxyethyl acrylate (which is commercially available as a product prepared by dimerisation of acrylic acid containing 10% by weight of higher oligomers of acrylic acid) and 2-carboxy-2-methylethyl methacrylate (which can be prepared by dimerisation of methacrylic acid); and carboxyl group-containing adducts of a hydroxyalkyl acrylate or hydroxyalkyl methacrylate with a polycarboxylic acid anhydride such as the adducts of this kind hereinbefore specified as suitable for polymerisation to form the solid polymer (A).

Suitable materials having, on average, more than one acryloyloxy or methacryloyloxy group per molecule include esters of epoxide resins with acrylic or methacrylic acid or with a carboxyl group-containing adduct of a hydroxyalkyl acrylate or hydroxyalkyl methacrylate with a polycarboxylic acid anhydride such as the adducts of this type hereinbefore specified; and the reaction products of a hydroxyalkyl acrylate or hydroxyalkyl methacrylate such as those hereinbefore specified with an isocyanate-terminated prepolymer derived from a polyol and a polyisocyanate. Examples of esters of epoxide resins include esters of acrylic acid or methacrylic acid with resins having, on average, more than one glycidyl group per molecule, preferably polyglycidyl ethers of polyhydric alcohols such as butane-1,4-diol, neopentyl glycol or polypropylene glycols, polyglycidyl ethers of polyhydric phenols such as bisphenol F, bisphenol A or a novolak resin, and advancement reaction products of such polyglycidyl ethers with dihydric alcohols or phenols.

Preferred materials having, on average, more than one acryloyloxy or methacryloyloxy group per molecule are polyacrylate and polymethacrylate esters of polyhydric alcohols, including esters of dihydric alcohols such as ethylene glycol, 1,2-propylene glycol, 1,3-propylene glycol, 1,3-butanediol, 1,4-butanediol, neopentyl glycol, 1,6-hexanediol, diethylene glycol, dipropylene glycol, triethylene glycol, tripropylene glycol, other polyoxyalkylene glycols, and adducts of ethylene oxide or propylene oxide with polyhydric phenols such as bisphenol F or bisphenol A; esters of trihydric alcohols such as glycerol, 1,1,1-trimethylolpropane, adducts of these alcohols with ethylene oxide or propylene oxide, and trishydroxyethyl isocyanurate; and esters of polyhydric alcohols having four or more hydroxyl groups such as erythritol, pentaerythritol, xylitol and sorbitol. Many of these polyacrylate and polymethacrylate esters are available commercially. Those which are not may be readily prepared by reacting the alcohol with acrylic or methacrylic acid or, more usually, an esterifying derivative thereof such as acryloyl chloride or methacryloyl chloride, using conventional procedures.

Especially preferred materials for use as (B) are 2-hydroxyethyl acrylate, 4-hydroxybutyl acrylate, 2-carboxyethyl acrylate, an adduct of 2-hydroxyethyl acrylate with maleic anhydride, ethylene glycol diacrylate, 1,3-butanediol diacrylate, 1,4-butabediol diacrylate, 1,6-hexanediol diacrylate, 1,1,1-trimethylolpropane triacrylate, pentaerythritol triacrylate, the corresponding methacrylates and mixtures of two or more thereof.

The adhesion of the film adhesive to substrates used in the laminates of the invention may often be improved if the film adhesive also contains, in addition to the polymer (A) and the curable material (B), (C) a polyether. It is believed that the film adhesives containing (A), (B) and (C) are novel. Suitable polyethers include polyoxyalkylene polyols such as polyethylene glycols, polypropylene glycols, copolymers of ethylene oxide and propylene oxide, polytetramethylene glycols and adducts of polyhydric alcohols, which may be dihydric alcohols such as 1,3-butanediol, 1,4-butanediol, neopentyl glycol or 1,6-hexanediol, trihydric alcohols such as glycerol or 1,1,1-trimethylolpropane, or tetrahydric alcohols such as pentaerythritol, with ethylene oxide or propylene oxide; poly(vinyl ethers), for example poly(alkyl vinyl ethers) such as poly(methyl vinyl ether); and phenoxy resins such as those derived from bisphenol A and epichlorohydrin. Preferred polyethers are polyoxyalkylene polyols such as those hereinbefore mentioned, polyethylene glycols and polypropylene glycols being particularly preferred.

In the film adhesive, the weight ratio of the solid polymer (A) to the curable material (B) may vary from 20:1 to 1:20 depending on the nature of the polymer and the curable material. For the preferred polymers and curable materials hereinbefore described, the weight ratio of (A) to (B) is preferably from 1:1 to 5:1. The amount of polyether (C), where present, may be up to 100%, preferably 5 to 75%, particularly 40 to 60%, by weight of the polymer (A).

In producing the laminates of the invention, the film adhesives may be photocured by exposure to actinic radiation or by heat. Where the film adhesive is to be photocured, it contains a photoinitiator for the photopolymerisation of acrylic groups. This can be any of the known initiators for the photopolymerisation of acrylic materials, used in a conventional amount, generally from 0.1 to 20%, preferably 1 to 10%, by weight of the polymerisable acrylic material. Thus the photopolymerisation initiator may be an aromatic carbonyl compound, for example a benzoin, a benzoin alkyl ether such as the isopropyl or n-butyl ether, an α-substituted acetophenone, for example a benzil ketal such as benzil dimethyl ketal, an α-haloacetophenone such as trichloromethyl p-tert.butylphenyl ketone, an α-aminoacetophenone such as dimethylaminomethyl phenyl ketone and morpholinomethyl phenyl ketone, a dialkyloxyacetophenone such as diethoxyacetophenone, or an α-hydroxyacetophenone such as 1-hydroxycyclohexylphenyl ketone or a benzophenone such as benzophenone itself and bis(4-dimethylamino)benzophenone; a metallocene, for example a titanium metallocene such as bis($\pi$-methylcyclopentadienyl)bis-($\sigma$-pentafluorophenyl) titanium (IV); a Group IVA organometallic compound, for example a stannane such as trimethyl benzyl stannane, tributyl benzyl stannane or dibutyl dibenzyl stannane, together with a photoreducible dye, typically methylene blue or rose bengal; a quinone, such as anthraquinone or camphorquinone, together with an amine having hydrogen attached to an aliphatic alpha carbon atom, preferably a tertiary amine such as bis(4-dimethylamino)benzophenone and triethanolamine; a thioxanthone, for example an alkyl- or halogen-substituted thioxanthone such as 2-isopropylthioxanthone or 2-chlorothioxanthone; an acyl phosphine oxide; or a mixture of two or more thereof.

Preferably, the photopolymerisation initiator is an α-substituted acetophenone, a thioxanthone, a metallocene or a mixture of two or more thereof. In particularly preferred embodiments, the initiator is a benzil dialkyl ketal.

When the film adhesive is to be cured by heating, it preferably contains a free radical polymerisation initiator. This can be any of the known free radical-generating initiators conventionally used in vinyl polymerisation and is preferably an organic peroxide or azo compound. The initiators can be used in conventional amounts, generally from 0.01 to 15%, preferably 0.05 to 10%, by weight of the polymerisable material. Suitable organic peroxides include dialkyl peroxides such as tert.butyl peroxide and 2,2-bis(tert.butylperoxy)propane, diacyl peroxides such as benzoyl peroxide and acetyl peroxide, peresters such as tert.butyl perbenzoate and tert.butyl per-2-ethylhexanoate, perdicarbonates such as dicetyl peroxy dicarbonate and dicyclohexyl peroxy dicarbonate, ketone peroxides such as cyclohexanone peroxide and methylethylketone peroxide, and hydroperoxides such as cumene hydroperoxide and tert.butyl hydroperoxide. Suitable azo compounds include azo bis(isobutyronitrile) and azo bis(2,4-dimethylvaleronitrile). Accelerators of free radical polymerisation, for example tertiary amines, ketimines, transition metal salts such as cobalt naphthenate and vanadium monobutyl phosphite and sulphimides, may be used together with the initiators.

The affect of solvents such as water, especially cold water, on the adhesive can be reduced by incorporating a $C_{10}$-$C_{20}$amine in the adhesive composition before it is cured. The amine may be primary or secondary, but is preferably a tertiary amine, and should be hydrophobic. A particularly suitable amine is N,N-dimethyl dodecylamine. The amine may be used in amounts of up to 50% but preferably up to 20% of the theoretical amount needed to neutralise the polyacrylic groups.

The mechanical properties of the cured film adhesive may be improved, when desired, by including in the adhesive a toughening polymer, preferably an elastomeric polymer. Toughening elastomeric polymers are well known in the adhesives art, including polymers of conjugated dienes such as butadiene and isoprene, which may be homopolymers or copolymers with other ethylenically unsaturated materials, particularly styrene, substituted styrenes and acrylic monomers such as acrylonitrile, alkyl acrylates and alkyl methacrylates. These diene polymers may have terminal functional groups such as amino, carboxyl or vinyl groups. Preferred elastomeric polymers are vinyl-terminated butadieneacrylonitrile copolymers, preferably those having a number average molecular weight of 500 upwards.

The film adhesive may also contain other additives conventionally included in adhesive compositions, for example polymerisation inhibitors such as hydroquinone and 2,6-ditert.butyl-4-methylphenol, adhesion promoters such as silanes, polymeric additives such as ethylene-vinyl acetate copolymers, polyurethanes, polyvinyl formals and polyvinyl butyrals, and fillers such as silica floor or ground glass. Of course, when the film adhesive is to be photocured, a filler used therein should be sufficiently transparent to the radiation used that it does not prevent cure. Selection of a suitable filler is a routine matter for those skilled in the art of radiation polymerisation.

The film adhesive may be produced in a conventional manner. Thus it may be cast, onto one or both of the surfaces to be bonded or, preferably, onto a release surface such as silicone-treated paper, from a solution of (A) and (B) and, where present, (C) and the other optional ingredients in a volatile solvent such as methanol, ethanol, isopropanol or methylene chloride. In another procedure the film adhesive may be formed without the use of solvents by subjecting a mixture of the ingredients to heat and pressure under conditions which do not induce polymerisation.

The sheet to be bonded by the film adhesive may be a sheet of paper, which may comprise cellulosic fibres and/or synthetic polymeric fibres such as polyester, polyamide or polyolefin fibres, or a non-fibrous sheet of a polymeric material such as a polyester or cellulose acetate film, which may be reinforced with, for example, fibres which may be natural, synthetic polymeric, carbon or glass fibres. Preferably the sheet is of paper or of polyester film. In accordance with conventional practice in security cards, this sheet is usually data-carrying. The data may comprise a photograph of, for example, the person to whom the card is to be issued or may comprise other printed pictorial or alphanumerical data. In many instances the data is present in a gelatin layer formed on the sheet, the gelatin layer being located next to the film adhesive in the laminates of the invention.

The thermoplastic polymeric film may be, for example, a film, preferably a transparent film, of a polyethylene, a copolymer of ethylene and vinyl acetate, a polyester, a polycarbonate or a cellulose acetate or a multilayer film comprising layers of two or more of these polymers. Preferred films are transparent films of a polyester or a cellulose triacetate. The thermoplastic polymeric film may also have a gelatin layer thereon, this layer being located next to the film adhesive in the laminates of the invention. The thermoplastic film may be data-carrying; for example, it may have, on the surface to be bonded, a layer of gelatin bearing a holographic image.

The substrates to be bonded may be treated in a conventional manner to improve adhesion, for example by corona discharge treatment.

In many instances, particularly where data is carried on the sheet of cellulosic material or synthetic polymeric material, a thermoplastic polymeric film as hereinbefore described may be bonded to each side of said sheet by a film adhesive as hereinbefore described.

In producing a laminate in accordance with the invention, before subjecting the film adhesive to curing conditions therefor, the assembly of the sheet of cellulosic material or synthetic polymeric material, the film adhesive and the thermoplastic polymeric film is preferably subjected to pressure to remove air trapped in the assembly. This pressure may be hand pressure; in commercial production processes, the assembly is more usually subjected to pressure in a laminating apparatus such as a laminating apparatus conventionally used in the production of security cards.

When the film adhesive contains a photoinitiator it may be cured by subjection to actinic radiation. In order to subject the film adhesive to actinic radiation either the sheet or the thermoplastic polymer film must be transparent to such radiation. The radiation may be exclusively ultraviolet radiation or it may be radiation having wavelengths in both the ultraviolet and visible regions of the spectrum. Radiation having a wavelength of 200 to 800 nm, especially 200 to 500 nm, is preferred. The selection, from commercially available equipment, of a suitable radiation source emitting radiation within this wavelength range is a routine matter for those skilled in the art of photocuring. Suitable sources include medium pressure mercury arc lamps and metal halide lamps. Suitable irradiation times may similarly be determined readily by those familiar with photocuring techniques.

When the film adhesive contains a free radical initiator, it may be cured by heating. Suitable temperatures to which the assembly of sheet, film adhesive and thermoplastic polymer film is heated are generally from 30° to 150° C., preferably from 80° to 130° C.

The invention is particularly useful where the data-carrying laminate is a security card, such as a credit card or identify card, or a passport photograph.

The invention is illustrated by the following Examples, in which all parts and percentages are by weight unless otherwise stated.

EXAMPLE 1

A homopolymer of acrylic acid having a weight average molecular weight of 250,000 (10 g), 2-hydroxyethyl acrylate (4 g) and benzil dimethyl ketal (0.5 g) are dissolved in methanol (80 ml). The resulting solution is coated onto silicone-treated release paper and the solvent is allowed to evaporate, leaving a solid self-supporting film adhesive on the release paper. A cut piece of the film adhesive is transfer-red onto a sheet of stiff identity card paper having printed photographic and other printed data thereon by placing the piece of film adhesive, with its release paper backing outwards, in contact with the identity card paper, heating the resulting assembly for 30 seconds at 100° C. and peeling the release paper from the film adhesive. A hologram, consisting of a transparent polyester photographic support film having thereon a layer of gelatin bearing a holographic image, is applied to the film adhesive so that the gelatinous layer is in contact with the adhesive. The resulting assembly is heated at 100° C. for 30 seconds and hand pressure is applied to remove any air trapped in the assembly and ensure good contact between the film adhesive and the surfaces to be bonded, effectively forming a temporary or preliminary bond between those surfaces. The resulting assembly is irradiated under a 5000W metal halide lamp, with the transparent hologram layer uppermost, at a distance of 75 cm for 10 seconds to photocure the film adhesive and complete formation of the laminate. The bonding between the layers of the laminate is totally secure, so that on attempting to separate the hologram from the paper, either at ambient temperature or after heating the laminate at 100° C., the highest temperature to which the hologram can safely be heated, both the hologram and the paper are destroyed.

EXAMPLE 2

The procedure of Example 1 is repeated, replacing the 2-hydroxyethyl acrylate by 1,6-hexanediol diacrylate (4 g). A laminate with totally secure bonding is formed, so that on attempting to remove the hologram from the paper, either at ambient temperature or after heating the laminate at 100° C., both the hologram and the paper are destroyed.

EXAMPLE 3

The procedure of Example 1 is repeated, replacing the 2-hydroxyethyl acrylate by a mixture of 2-carboxyethyl acrylate (2 g) and 2-hydroxyethyl acrylate (2 g). A laminate with totally secure bonding is formed, so that on attempting to separate the hologram from the paper, either at ambient temperature or after heating the laminate at 100° C., both the hologram and the paper are destroyed.

EXAMPLE 4

The procedure of Example 1 is repeated, replacing the 2-hydroxyethyl acrylate by 1,3-butanediol dimethacrylate (4 g). The bonding in the resulting laminate is totally secure, so that on attempting to remove the hologram from the paper, either at ambient temperature or after heating the laminate at 100° C., both the hologram and the paper are destroyed.

EXAMPLE 5

The procedure of Example 1 is repeated, replacing the 2-hydroxyethyl acrylate by 1,4-butanediol dimethacrylate (4 g). Adhesion between the layers in the resulting laminate is totally secure, so that on attempting to remove the hologram from the paper, either at ambient temperature or after heating the laminate, at 100° C., both the hologram and the paper are destroyed.

EXAMPLE 6

The procedure of Example 1 is repeated, replacing the 2-hydroxyethyl acrylate by ethylene glycol dimethacrylate (4 g). A laminate with totally secure bonding is formed, so that on attempting to separate the hologram from the paper, either at ambient temperature or after heating the laminate at 100° C., both the hologram and the paper are destroyed.

EXAMPLE 7

The procedure of Example 1 is repeated, replacing the 2-hydroxyethyl acrylate by 2-hydroxyethyl methacrylate (4 g). A laminate with totally secure bonding is formed, so that on attempting to separate the hologram from the paper, either at ambient temperature or after heating the laminate at 100° C., both the hologram and the paper are destroyed.

EXAMPLE 8

The procedure of Example 1 is repeated, replacing the 2-hydroxyethyl acrylate by a mixture of pentaerythritol triacrylate (1 g) and 2-hydroxyethyl acrylate (3 g). A laminate with totally secure bonding is formed, so that on attempting to separate the hologram from the paper, either at ambient temperature or after heating the laminate at 100° C., both the hologram and the paper are destroyed.

EXAMPLE 9

The procedure of Example 1 is repeated, replacing the 2-hydroxyethyl acrylate by 4 g of the mono(acryloyloxyethyl) ester of maleic acid (i.e. the adduct of 2-hydroxyethyl acrylate and maleic anhydride). A laminate with totally secure bonding is formed, so that on attempting to separate the hologram from the paper, either at ambient temperature or after heating the laminate at 100° C., both the hologram and the paper are destroyed.

EXAMPLE 10

The procedure of Example 1 is repeated, except that the 2-hydroxyethyl acrylate is replaced by 1,6-hexanediol diacrylate (4 g), a polyoxyethylene glycol having a weight average molecular weight of 14,000 (5 g) is dissolved in methanol together with the other ingredients, and an image-free transparent polyester film having a gelatin layer thereon (total thickness 170 micrometers) is used in place of the hologram. A laminate with totally secure bonding is formed, so that on attempting to separate the film from the paper, either at ambient temperature or after heating the laminate at 135° C., the paper ais estroyed.

EXAMPLE 11

The procedure of Example 1 0 is repeated, replacing the polyoxyethylene glycol used in that Example by a polyoxyethylene glycol having a weight average molecular weight of 3,400 (5 g). Adhesion between the layers in the resulting laminate is totally secure, on attempting to remove the film from the paper, either at ambient temperature or after heating the laminate at 135° C., the paper is destroyed.

EXAMPLE 12

The procedure of Example 10 is repeated, replacing the 1,6-hexanediol diacrylate by a mixture of pentaerythritol triacrylate (2 g) and 1,6-hexanediol diacrylate (2 g). A laminate with totally secure bonding is produced, so that on attempting to separate the film from the paper, either at ambient temperature or after heating the laminate at 135° C., the paper is destroyed.

EXAMPLE 13

The procedure of Example 10 is repeated, replacing the polyoxyethylene glycol used in that Example by a polyoxypropylene glycol having a weight average molecular weight of 1500 (5 g). Adhesion between the layers in the resulting laminate is totally secure so that on attempting to remove the film from the paper, either at ambient temperature or after heating the laminate at 135° C., the paper is destroyed.

EXAMPLE 14

The procedure of Example 10 is repeated, replacing the 1,6-hexanediol diacrylate by 4-hydroxybutyl acrylate (4 g) and replacing the polyoxyethylene glycol by a polyoxypropylene glycol having a weight number average molecular weight of 2000. A laminate with totally secure bonding is produced, so that on attempting to separate the film from the paper, either at ambient temperature or after heating the laminate at 135° C., the paper is destroyed.

EXAMPLE 15

The procedure of Example 1 is repeated, using a mixture of 8 g of the acrylic acid homopolymer and 2 g of a copolymer of equal weights of methacrylic acid and methyl methacrylate having a weight average molecular weight of 78,000. A laminate with totally secure bonding is produced, so that on attempting to separate the hologram from the paper, either at ambient temperature or after heating the laminate at 100° C., both are destroyed.

EXAMPLES 16–20

Examples 10 to 14 are repeated, except that instead of using hand pressure to expel air and form the preliminary bond the assembly of identity card paper, film adhesive and transparent polyester film is passed through a hot roll laminator having a temperature setting of 150° C. Laminates with totally secure bonding are produced, so that on attempting to separate the film from the paper, either at ambient temperature or after heating the laminate at 135° C., the paper aisdestroyed.

EXAMPLE 21

The procedure of Example 12 is repeated, but omitting the benzil dimethyl ketal from the film adhesive, including benzoyl peroxide (0.1 part), replacing the glycol used in that Example by a polyoxyethylene glycol having a weight average molecular weight of 3400, omitting the irradiation step and heat-curing the film adhesive by heating the assembly of identity card paper, film adhesive and polyester film at 135° C. for 2 minutes. A laminate with totally secure bonding is produced, so that on attempting to remove the polyester from the paper, either at ambient temperature or after heating the laminate at 135° C., the paper is destroyed.

EXAMPLE 22

The procedure of Example 10 is followed except that the acrylic acid homopolymer has a weight average molecular weight of 450,000, the 1,6-hexanediol diacrylate is replaced by a mixture of pentaerythritol triacrylate (2.5 g), and 2-hydroxyethyl acrylate (2.5 g), the benzil dimethyl ketal is replaced by 1-hydroxycyclohexylphenyl ketone (0.5 g) and in addition N,N-dimethyldodecylamine (5 g) is added. Adhesion between the layers in the resulting laminate is totally secure, so that on attempting to remove the film from the paper, either at ambient temperature or after heating the laminate at 135° C., the paper is destroyed.

We claim:

1. A data-carrying laminate which comprises a sheet of cellulosic material, synthetic polymeric material or a mixture thereof and a thermoplastic polymeric film, at least one of said sheet and said thermoplastic film carrying data, wherein said sheet and said thermoplastic film are bonded together by a cured adhesive layer obtained by curing a solid film adhesive comprising (A) a solid polymer of a vinyl carboxylic acid and (B) a curable material having at least one acrylate or methacrylate group, and wherein said film adhesive does not include a carboxylic acid having a polymerizable acrylic group.

2. A laminate according to claim 1, in which (A) is a polymer of acrylic or methacrylic acid.

3. A laminate according to claim 2, in which (A) is a homopolymer of acrylic acid, a copolymer of acrylic or methacrylic acid with at least one other vinyl monomer, or a mixture of two or more thereof.

4. A laminate according to claim 2, in which (A) has a weight average molecule weight of 50,000 to 500,000.

5. A laminate according to claim 1, in which (B) is a hydroxyalkyl acrylate, a hydroxyalkyl methacrylate, a polyacrylate or polymethacrylate ester of a polyhydric alcohol, or a mixture of two or more thereof.

6. A laminate according to claim 1, in which the weight ratio of the polymer (A) to the curable material (B) is from 1:1 to 5:1.

7. A laminate according to claim 1, in which the film adhesive also contains (C) a polyether.

8. A laminate according to claim 7, in which the polyether (C) is present in an amount of 5 to 75% by weight of the polymer (A).

9. A laminate according to claim 1, in which the film adhesive also contains a photoinitiator for the photopolymerisation of acrylic groups and is photocured.

10. A laminate according to claim 1, in which the film adhesive contains a free radical polymerisation initiator and is heat-cured.

11. A laminate according to claim 1, in which the film adhesive also contains a hydrophobic amine.

12. A laminate according to claim 1, in which the data is present in a gelatin layer formed on the sheet, the gelatin layer being located next to the film adhesive.

13. A laminate according to claim 1, in which said thermoplastic film has, on the surface bonded to said sheet, a layer of gelatin bearing a holographic image.

14. A laminate according to claim 1, in which a thermoplastic film is bonded to each side of said sheet.

* * * * *